(12) United States Patent
Osaka

(10) Patent No.: US 8,026,978 B2
(45) Date of Patent: Sep. 27, 2011

(54) CAMERA MODULE WITH AXIALLY DISPLACEABLE LENS UNIT HOLDER

(75) Inventor: Tomohiko Osaka, Yamagata (JP)

(73) Assignee: Mitsumi Electric Co., Ltd. (JP)

( * ) Notice: Subject to any disclaimer, the term of this patent is extended or adjusted under 35 U.S.C. 154(b) by 354 days.

(21) Appl. No.: 12/129,314

(22) Filed: May 29, 2008

(65) Prior Publication Data

US 2008/0297642 A1    Dec. 4, 2008

(30) Foreign Application Priority Data

May 31, 2007    (JP) ................................. 2007-145319

(51) Int. Cl.
H04N 5/225    (2006.01)

(52) U.S. Cl. ......................... 348/374; 348/335; 348/345

(58) Field of Classification Search .................. None
See application file for complete search history.

(56) References Cited

U.S. PATENT DOCUMENTS

| | | | |
|---|---|---|---|
| 7,291,942 B2 * | 11/2007 | Osaka ......................... | 310/12.04 |
| 7,880,982 B2 * | 2/2011 | Otsuki et al. ................... | 359/819 |
| 2006/0028320 A1 * | 2/2006 | Osaka ......................... | 340/384.1 |
| 2006/0028929 A1 * | 2/2006 | Osaka ......................... | 369/44.14 |
| 2007/0091199 A1 * | 4/2007 | Shiraki et al. ................. | 348/345 |
| 2010/0039719 A1 * | 2/2010 | Park et al. ..................... | 359/824 |

FOREIGN PATENT DOCUMENTS

| | | |
|---|---|---|
| JP | 08162045 | 6/1996 |
| JP | 2002299885 | 10/2002 |
| JP | 2007047281 | 2/2007 |
| JP | 2007065430 | 3/2007 |

(Continued)

OTHER PUBLICATIONS

Camera Module, U.S. Appl. No. 11/683,956, filed Mar. 8, 2007, Toshihiko Honma.

(Continued)

Primary Examiner — David Ometz
Assistant Examiner — Angel L Garces-Rivera
(74) Attorney, Agent, or Firm — Marger, Johnson & McCollom, P.C.

(57) ABSTRACT

A camera module includes a lens unit; a holder which houses the lens unit therein and is displaceable along an optical axis direction of the lens unit; a coil provided on the holder; a yoke, four main magnets and two flat plate-shaped auxiliary magnets which provide a magnetic field to the coil, in which the yoke has a roughly rectangular and relatively thin box shape of which bottom side is opened so that the yoke is defined by four side wall portions and a top plate portion, and the yoke also has an opening formed in the top plate portion for receiving the holder; upper and lower leaf springs respectively attached to the upper and lower cylindrical end portions of the holder for supporting the holder so as to be displaceable along the optical axis direction; and a base which supports the yoke and the lower leaf spring. In the camera module, the coil is formed into a roughly cylindrical shape having two opposite outer circumferential flat surfaces, each of the four main magnets has a triangle block shape and they are respectively arranged at the four corner portions inside the yoke, and the two auxiliary magnets are respectively arranged on a pair of the opposite side wall portions of the yoke so as to face the corresponding outer circumferential flat surfaces of the coil, respectively.

3 Claims, 4 Drawing Sheets

FOREIGN PATENT DOCUMENTS

| | | |
|---|---|---|
| JP | 2007-121853 | 5/2007 |
| WO | 2006126545 A1 | 11/2006 |

OTHER PUBLICATIONS

Camera Module, U.S. Appl. No. 11/846,315, filed Aug. 28, 2007, Takashi Ishizawa, Osaka Tomohiko.

Camera Module, U.S. Appl. No. 11/846,442, filed Aug. 28, 2007, Takashi Ishizawa, Osaka Tomohiko.

Camera Module, U.S. Appl. No. 11/846,380, filed Aug. 28, 2007, Takashi Ishizawa, Osaka Tomohiko.

Camera Module, U.S. Appl. No. 11/853,629, filed Sep. 11, 2007, Takashi Ishizawa, Osaka Tomohiko.

Camera Module, U.S. Appl. No. 11/861,125, filed Sep. 25, 2007, Osaka Tomohiko, Takashi Ishizawa.

Camera Module, U.S. Appl. No. 11/928,127, filed Oct. 30, 2007, Osaka Tomohiko, Takashi Ishizawa.

Camera Module, U.S. Appl. No. 11/928,367, filed Oct. 30, 2007, Osaka Tomohiko, Takashi Ishizawa.

Camera Module, U.S. Appl. No. 12/017,546, filed Jan. 22, 2008, Toshihiko Honma, Masayuki Itagaki.

Camera Module, U.S. Appl. No. 12/021,155, filed Jan. 28, 2008, Toshihiko Honma.

Camera Module, U.S. Appl. No. 12/129,314, filed May 29, 2008, Osaka Tomohiko.

* cited by examiner

CAMERA MODULE WITH AXIALLY DISPLACEABLE LENS UNIT HOLDER

BACKGROUND OF THE INVENTION

1. Field of the Invention

This invention relates to a camera module, and more specifically to a camera module that can be used in small-sized electronic apparatuses such as digital cameras, camera-equipped cellular phones and the like.

2. Description of the Prior Art

A camera module having a function of displacing a lens unit in a direction of an optical axis of the lens unit is used in relatively small-sized digital cameras, camera-equipped cellular phones and the like. This function is used for providing an autofocus function and/or zoom function, and is achieved by an interaction between a magnetic field generated by an electrical current flowing in a coil and a magnetic field generated by a yoke and magnets provided on the yoke. Recently, camera modules to be mounted in camera-equipped cellular phones are required to further reduce size and shape thereof.

FIG. 4 shows an actuator assembly for providing an autofocus function used in a conventional camera module. The actuator assembly 100 includes a holder 103 which houses a lens unit (not shown in the drawing), a coil 101 wound around the holder 103, a base 104 formed into a roughly square shape having four corner posts near the four corner thereof, four magnets 102 respectively arranged near the four corner posts of the base 104, and a spring 105 for resiliently supporting the holder 103.

In the actuator assembly 100, by supplying an electrical current to the coil 101 provided on the holder 103, a repellent force is generated by the magnetic fields provided by the four magnets 102 and the coil 101. Further, by utilizing a spring force of the spring 105, the holder 103 can be displaced up and down directions in the figure to carry out the autofocus function.

One example of a camera module having such an actuator assembly 100 is disclosed in a publication of Japanese Utility Model Registration No. 3124292.

In the actuator assembly 100 described above, the four magnets 102 are arranged on the corners of the roughly square-shaped base 104. Therefore, when the entire size of the camera is to be reduced, there is a problem in that sufficient thickness of each of the magnets 102 cannot be secured. This is because if the thickness of each magnet 102 is reduced, the distance between the N pole and the S pole in each magnet is shortened, thus resulting in a reduced magnetic force.

Further, in the actuator assembly 100 described above, the reduced magnetic field intensity due to the reduced size of each magnet is compensated by the provision of the spring 105. However, if the entire size of the camera module is to be further reduced, there arises another problem in that it becomes difficult to secure a space for providing the spring 105.

SUMMARY OF THE INVENTION

The present invention has been made in view of the problems described above, and therefore it is an object of the present invention to provide a camera module that can provide a sufficient driving force of a holder even in the case where the entire size of the camera module is reduced.

In order to achieve the object, the present invention is directed to a camera module, which comprises:

a lens unit which constitutes an optical system of the camera module;

a holder which houses the lens unit therein and is displaceable along an optical axis direction of the camera module, the holder having a cylindrical shape having upper and lower cylindrical end portions;

a coil provided on the holder;

a yoke, four main magnets and two flat plate-shaped auxiliary magnets which provide a magnetic field to the coil, in which the yoke has a roughly rectangular and relatively thin box shape of which bottom side is opened so that the yoke is defined by four side wall portions and a top plate portion, and the yoke also has an opening formed in the top plate portion for receiving the holder and four corner portions inside thereof;

upper and lower leaf springs respectively attached to the upper and lower cylindrical end portions of the holder for supporting the holder so as to be displaceable along the optical axis direction of the lens unit; and a base which supports the yoke and the lower leaf spring.

In this camera module having the above-structure, the coil is formed into a roughly cylindrical shape having two opposite outer circumferential flat surfaces, each of the four main magnets has a triangle block shape and they are respectively arranged at the four corner portions inside the yoke, and the two auxiliary magnets are respectively arranged on a pair of the opposite side wall portions of the yoke so as to face the corresponding outer circumferential flat surfaces of the coil, respectively.

According to the camera module of the present invention having the structure described above, since each of the main magnets has the triangle block shape, it is possible to lengthen the distances between the N pole and the S pole in each magnet, and further they can effectively utilize the spaces of the corner portions of the yoke. Thus, it is possible to solve the problem of the reduced magnetic force occurring due to reduction of distance between an N pole and an S pole which would be caused when a flat plate-shaped magnet like the prior art is used.

Further, in the camera module of the present invention, it is preferred that the camera module further comprises a magnetic field correcting magnet, wherein the magnetic field correcting magnet is arranged so as to provide a magnetic flux in a vertical direction with respect to a direction of a magnetic flux of the main magnets and auxiliary magnets so that the magnetic flux of the main magnets and auxiliary magnets is directed toward the coil.

This make it possible to allow the direction of the magnetic flux of the main magnets and auxiliary magnets to be forcedly directed toward the direction where the coil is provided, whereby the magnetic forces of the main magnets and auxiliary magnets can be effectively exerted on the coil.

Furthermore, in the camera module of the present invention having the above structure, it is also preferred that the base is made of a magnetic material, and the magnetic field correcting magnet is formed by magnetizing at least a part of the base.

With this structure, since the base and the magnetic field correcting magnet are not necessary to be constructed from separate components, it is possible to achieve reduction in number of components in the camera module.

The above and other objects, features and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

Figure 1:
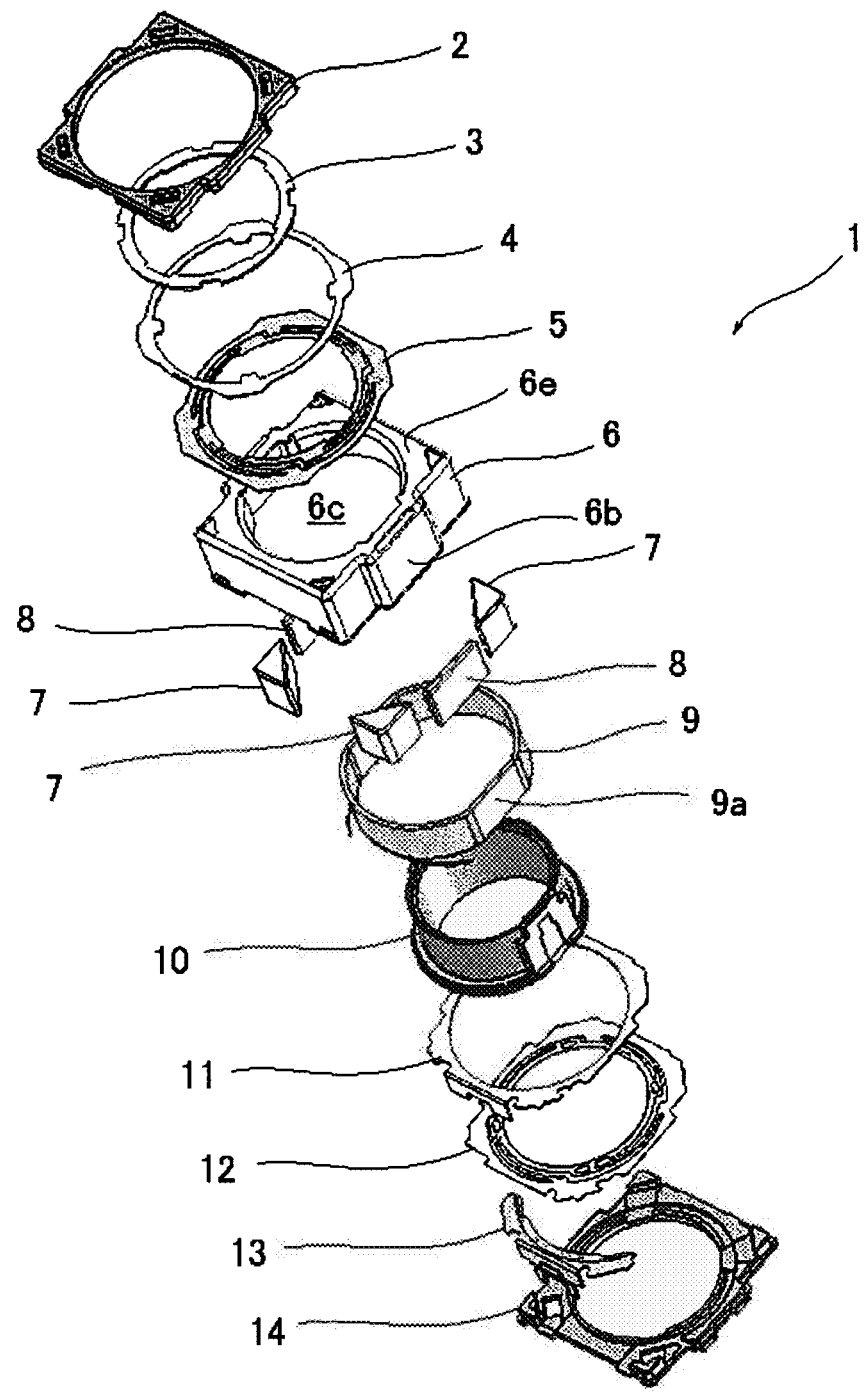
FIG. 1 is an exploded perspective view of an actuator assembly 1 used in a camera module of an embodiment according to the present invention.

A camera module according to an embodiment of the present invention will be described below with reference to the accompanying drawings.

An actuator assembly 1 of a camera module according to the embodiment includes: a lens unit which constitutes an optical system of the camera module (not shown in the drawings); a holder 10 which houses the lens unit therein and is displaceable along the optical axis direction of the camera module, the holder 10 having a roughly cylindrical shape having upper and lower cylindrical end portions; a coil 9 provided on the holder 10; and a yoke 6, four main magnets 7 and two flat plate-shaped auxiliary magnets 8 which provide a magnetic field to the coil 9. The yoke 6 has a roughly rectangular and relatively thin box shape of which bottom side is opened so that the yoke 6 is defined by four side wall portions 6b and a top plate portion 6e, and the yoke 6 also has an opening 6c formed in the top plate portion 6e for receiving the holder 10 and four corner portions 6a inside thereof. The actuator assembly 1 of the camera module further includes an upper leaf spring 5 and a lower leaf spring 12 for supporting the holder 10; and a base 14 which supports the yoke 6 and the lower leaf spring 12.

In the actuator assembly 1, the coil 9 is formed into a roughly cylindrical shape having two opposite outer circumferential flat surfaces 9a. Each of the four main magnets 7 has a triangle block shape and they are respectively arranged at the four corner portions 6a inside the yoke 6. Further, the two auxiliary magnets 8 are respectively arranged on a pair of the opposite side wall portions 6b of the yoke 6 so as to face the corresponding outer circumferential flat surfaces 9a of the coil 9, respectively.

Hereinbelow, with reference to FIG. 1, a detailed description will be made with regard to the actuator assembly 1 of the camera module of the embodiment. In this regard, it is to be noted that an imaging element (not shown in the drawing) is provided below the base 14.

The holder 10 which houses a barrel (not shown) holding the lens unit therein is provided in a space defined between a cover 2 and the base 14 so that the holder 10 is displaceable in the direction of the optical axis of the lens unit.

An inner annular portion of the upper leaf spring 5 and an inner annular portion of the lower leaf spring 12 are respectively attached to the upper and lower cylindrical end portions of the holder 10, and an outer annular portion of the upper leaf spring 5 is attached to the top plate portion 6e of the yoke 6 and an outer annular portion of the lower leaf spring 12 is attached to the base 14. The inner annular portion of the upper leaf spring 5 is resiliently supported by the outer annular portion of the upper leaf spring 5 through bridge portions provided therebetween, and the inner annular portion of the lower leaf spring 12 is resiliently supported by the outer annular portion of the lower leaf spring 12 through bridge portions provided therebetween.

The yoke 6, the main magnets 7 and the auxiliary magnets 8 generate a magnetic field. The coil 9 is disposed in the magnetic field generated by the yoke 6, the main magnets 7 and the auxiliary magnets 8. Specifically, the coil 9 is provided on the outer periphery of the holder 10 so that the coil 9 is positioned in a space between a pair of arch-shaped inner wall portions 6d of the yoke 6 provided along the outer periphery of the opening 6c and the main magnets 7 and the auxiliary magnets 8 in a state that the holder 10 is inserted into the opening 6c. The holder 10 can be displaced in a direction of the optical axis of the lens unit by supplying a current to the coil 9.

It is to be noted that a component denoted by the reference numeral 3 is a stopper provided on the upper side of the inner annular portion of the upper leaf spring 5, and a component denoted by the reference numeral 4 is a first annular plate provided on the upper side of the outer annular portion of the upper leaf spring 5. A component denoted by the reference numeral 11 is a second annular plate provided on the outer annular portion of the lower leaf spring 12, and a component denoted by the reference numeral 13 is a flexible printed circuit board for supplying a current to the coil 9.

Figure 2:
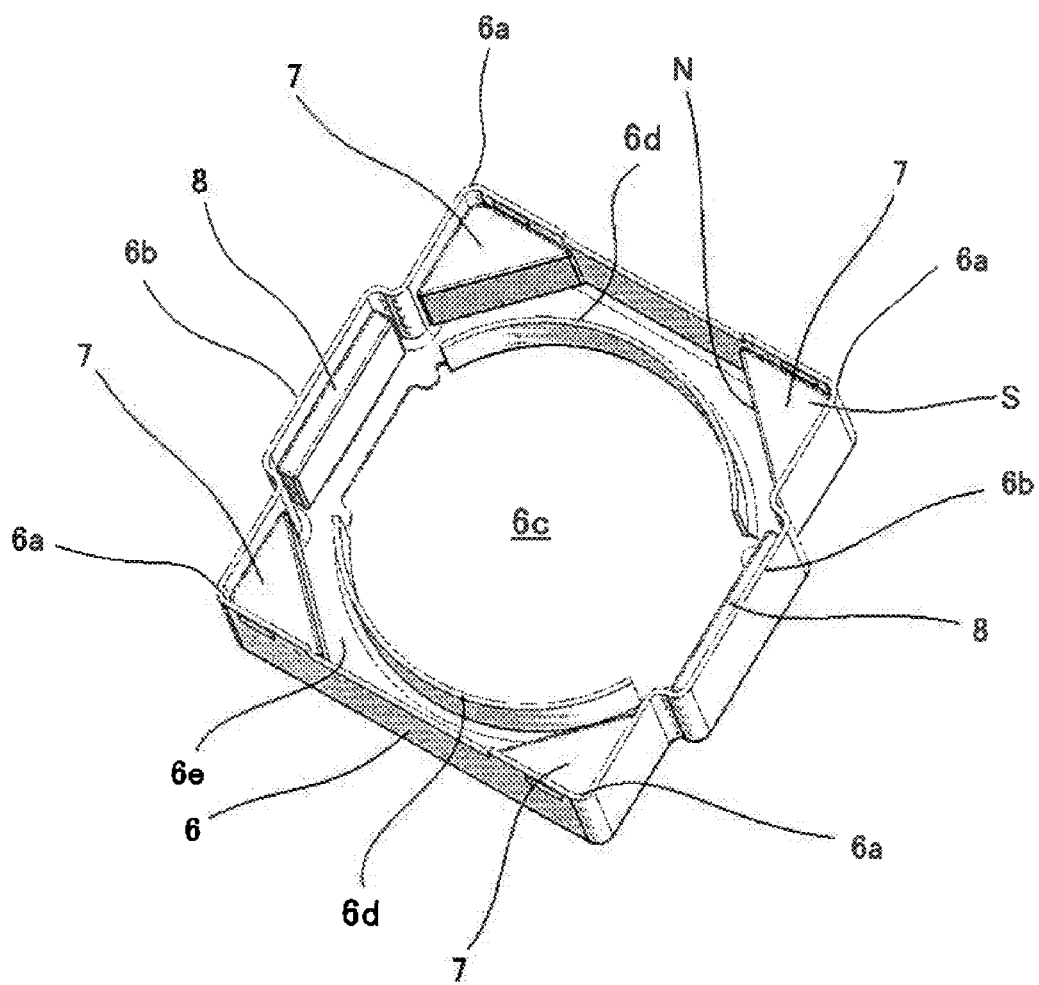
FIG. 2 is a perspective view which shows a yoke 6, main magnets 7 and auxiliary magnets 8 of the actuator assembly 1 shown in FIG. 1.

Next, with reference to FIGS. 1 to 3, a more detailed description will be made with regard to the yoke 6, the main magnets 7, the auxiliary magnets 8, the coil 9 and the base 14. As described above, the yoke 6 is formed into a roughly rectangular and relatively thin box shape of which bottom side is opened so that the yoke 6 is defined by the four side wall portions 6b and the top plate portion 6e. As a result, the four corner portions 6a are defined inside thereof. Further, the yoke 6 has the opening 6c formed in the top plate portion 6e for receiving the holder 10. Further, the yoke 6 also includes inside thereof the pair of arch-shaped inner wall portions 6d provided along the outer periphery of the opening 6c, wherein the pair of arch-shaped inner wall portions 6d of the yoke 6 are arranged so that two gaps are created between the adjacent end portions of the inner wall portions 6d. Each of the four main magnets 7 is formed to have a triangle block shape (the triangle block having an equilateral triangle shape in its cross section). These four main magnets 7 are respectively arranged at the four corner portions 6a inside the yoke 6. The two flat plate-shaped auxiliary magnets 8 are respectively arranged on the concave portions of the opposite side wall portions 6b of the yoke 6 as illustrated in FIG. 2. As described above, the coil 9 supported by the holder 10 is positioned in a space between the pair of arc-shaped inner wall portions 6d and the main magnets 7 and the auxiliary magnets 8 in a state that the holder 10 is inserted into the opening 6c of the yoke 6.

The coil 9 is formed into a cylindrical coil which has the two opposite outer circumferential flat surfaces 9a. The coil 9 provided on the holder 10 is disposed in the space between the pair of arch-shaped inner wall portions 6d of the yoke 6 and the main magnets 7 and the auxiliary magnets 8 so that the two opposite outer circumferential flat surfaces 9a of the coil 9 face the auxiliary magnets 8, respectively, in a state that the holder 10 is inserted into the opening 6c of the yoke 6. In this state, the two opposite outer circumferential flat surfaces 9a of the coil 9 are also located at positions of the gaps created between the adjacent end portions of the inner wall portions 6d of the yoke 6.

As shown in FIG. 2, each of the four main magnets 7 formed into the triangle block shape is magnetized so that its inner side portion (that is, a side of each magnet 7 facing the coil 9) becomes an N pole and its outer corner side becomes an S pole. Since each of the main magnets 7 has such a triangle block shape (that is, an equilateral triangle shape in its cross section), it is possible to effectively utilize the spaces of the corner portions 6a of the yoke 6. Further, in each main magnet 7 having such a triangle block shape, the distance between the inner side portion of the N pole and the outer corner portion of the S pole can be made to be relatively long. Thus, it is possible to solve the problem of a reduced magnetic force which would occur due to reduction of a distance between an N pole and an S pole which would be caused when a flat plate-shaped magnet is used like the prior art discussed above. Therefore, even in the case where the entire size of the camera module is reduced, each of the main magnets 7 can secure a stable magnetic field of which magnetic force is difficult to be reduced even where a temperature of the camera module is raised.

Figure 3:
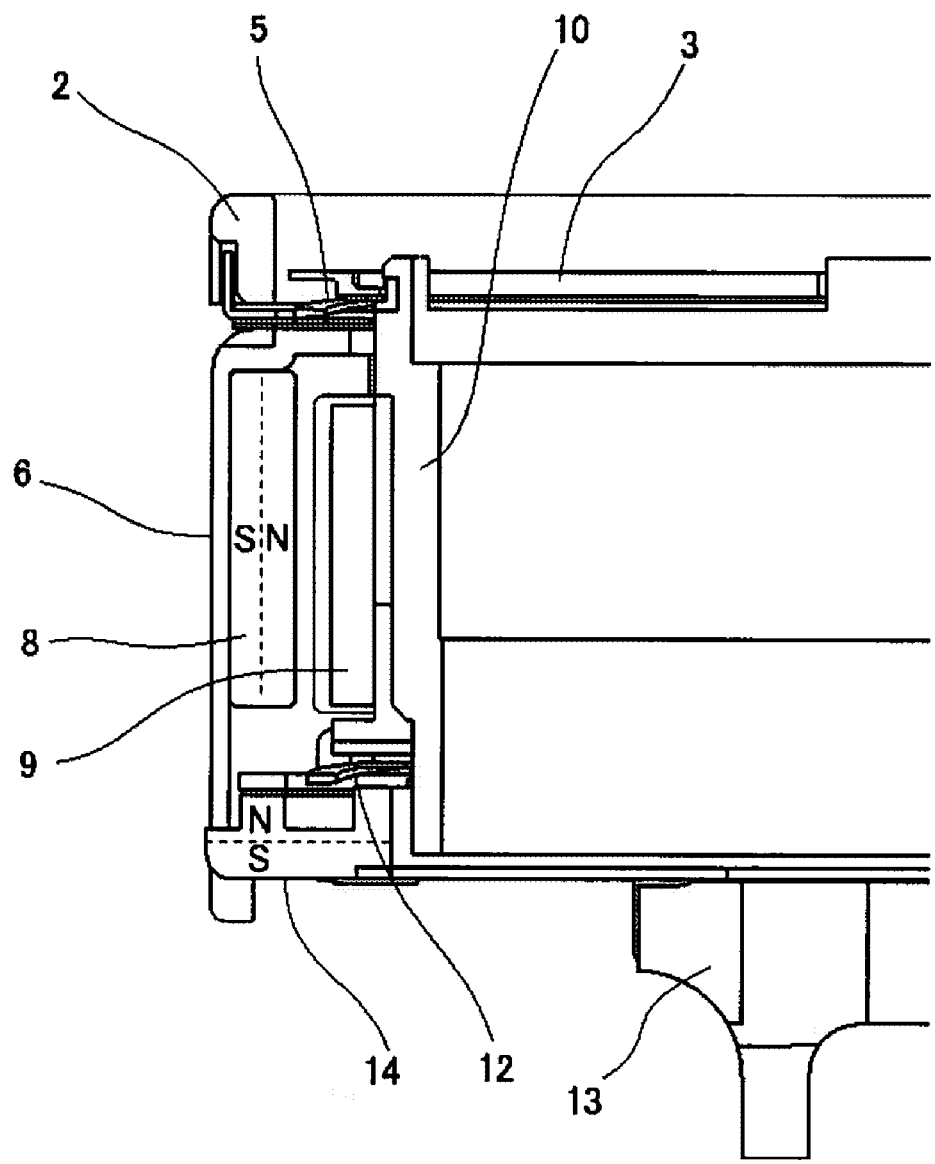
FIG. 3 is a partial cross sectional view of the actuator assembly 1 shown in FIG. 1.
Figure 4:
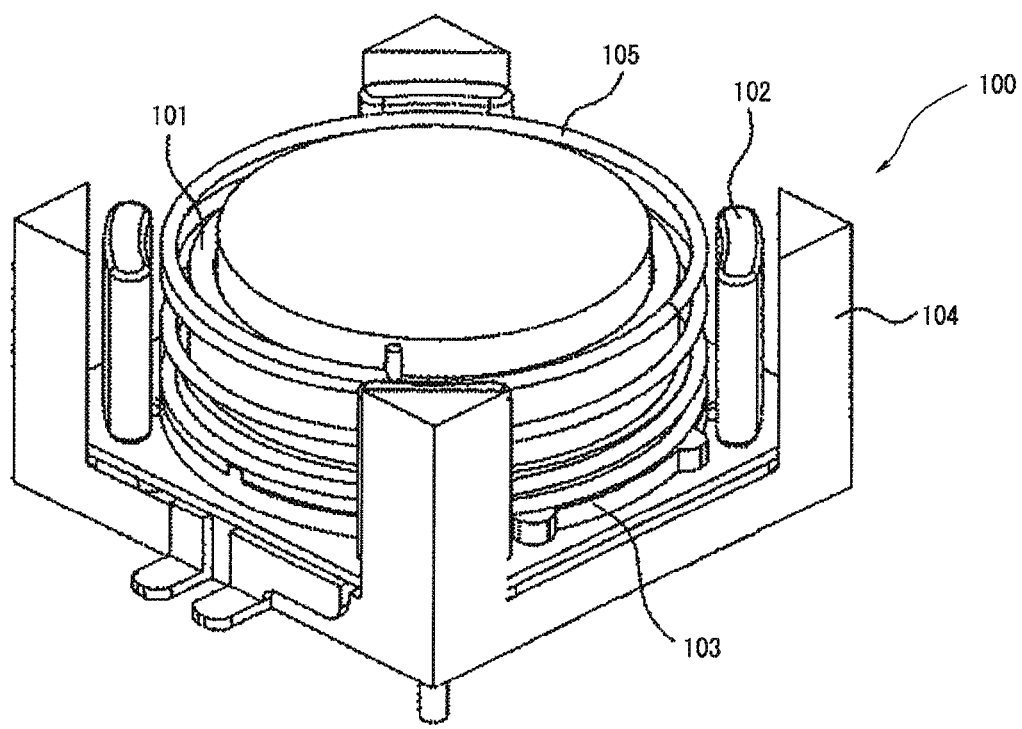
FIG. 4 is a perspective view which shows an actuator assembly 100 used in a conventional camera module.

As shown in FIG. 3, in each of the two auxiliary magnets 8, an inner side portion (facing the corresponding outer circumferential flat surface 9a of the coil 9) is magnetized to be an N pole and an outer side portion adjacent to the yoke 6 is magnetized to be an S pole. Further, the two auxiliary magnets 8 are arranged so as to face the corresponding outer circumferential flat surfaces 9a of the coil 9, respectively. Thus, the entire surfaces of the inner side portions (which are magnetized to be an N pole) of the auxiliary magnets 8 are arranged in a spaced manner at a predetermined interval from the entire surfaces of the outer circumferential flat surfaces 9a of the coil 9. Thus, magnetic fluxes which are generated by the auxiliary magnets 8 can pass through the coil 9 over a wide range of the outer circumferential flat surfaces 9a of the coil 9, thereby allowing magnetic forces of the auxiliary magnets 8 to be effectively exerted on the coil 9.

The base 14 is formed by magnetizing a magnetic material having a predetermined shape as a base and serves as a magnetic field correcting magnet of the present invention. As described in FIG. 3, the top surface side of the base 14 is magnetized to be an N pole and the bottom surface side of the base 14 is magnetized to be an S pole. A magnetic flux from the N poles of the main magnets 7 and auxiliary magnets 8 is generated in a horizontal direction, whereas a magnetic flux from the N pole of the top surface side of the base 14 is generated in a vertical direction. Therefore, the magnetic flux of the N pole of the base 14 which is the magnetic field correcting magnet acts against the magnetic flux of the N poles of the main magnets 7 and auxiliary magnets 8 repulsively, whereby the direction of the magnetic flux of the main magnets 7 and auxiliary magnets 8 is forcedly directed in a direction away from the base 14. That is to say, the direction of the magnetic flux of the main magnets 7 and auxiliary magnets 8 is forcedly directed toward the coil 9 as is understood from FIG. 3. Therefore, the magnetic forces of the main magnets 7 and auxiliary magnets 8 can be effectively exerted on the coil 9. Further, since the magnetic field correcting magnet is constructed using the base 14 in itself, it is not necessary for the base 14 and the magnet field correcting magnet to be constructed from separate components, which contributes to reduction in number of components in the camera module.

Hereinbelow, functions and effects of the camera module of the present invention will be described. According to the camera module of the embodiment described above, the coil 9 is the cylindrical shape which has the opposite two outer circumferential flat surfaces 9a, each of the four main magnets 7 has the triangle block shapes and they are respectively arranged at the four corner portions 6a inside the yoke 6, and the two auxiliary magnets 8 are respectively arranged on the concave portions of the opposite side portions 6b of the yoke 6 and are respectively arranged so as to face the outer circumferential flat surfaces 9a.

Since each of the main magnets 7 has the triangle block shape, it is possible to lengthen the distances between the N pole and the S pole in each magnet, and further they can effectively utilize the spaces of the corner portions 6a of the yoke 6. Thus, it is possible to solve the problem of the reduced magnetic force which would occur due to reduction of distance between an N pole and an S pole which would be caused when a flat plate-shaped magnet like the prior art is used.

Further, since the two auxiliary magnets 8 are arranged so as to face the outer circumferential flat surfaces 9a of the coil 9, it is possible to arrange the surfaces of the auxiliary magnets 8 in a spaced manner at predetermined intervals from the outer circumferential flat surfaces 9a of the coil 9. Thus, the magnetic fluxes which are generated by the auxiliary magnets 8 can pass through the coil 9 over a wide range of the outer circumferential flat surfaces 9a of the coil 9, thereby allowing the magnetic forces of the auxiliary magnets 8 to be effectively exerted on the coil 9.

Further, according to the embodiment described above, the camera module further includes the base 14 as the magnetic field correcting magnet, and the magnetic field correcting magnet is arranged so as to direct its magnetic flux in the vertical direction with respect to the direction of the magnetic flux of the main magnets 7 and auxiliary magnets 8, and thus, the magnetic flux of the magnetic field correcting magnet allows the direction of the magnetic flux of the main magnets 7 and auxiliary magnets 8 to be forcedly directed toward the direction where the coil 9 is provided. That is to say, the direction of the magnetic flux of the main magnets 7 and auxiliary magnets 8 is forcedly directed toward the direction where the coil 9 is provided, whereby the magnetic forces of the main magnets 7 and auxiliary magnets 8 can be effectively exerted on the coil 9.

Furthermore, according to the embodiment described above, the magnetic field correcting magnet is formed by magnetizing a part of the base 14. Therefore, since the base and the magnetic flux correcting magnet are not necessary to be constructed from separate components, it is possible to achieve reduction in number of components in the camera module.

Finally, it should be understood that the present invention is not limited to the preferred embodiment described hereinabove and, needless to say, a variety of modifications or variations may be made without departing from the scope of the invention defined in the following claims.

What is claimed is:

1. A camera module, comprising:
   a lens unit which constitutes an optical system of the camera module;
   a holder which houses the lens unit therein and is displaceable along an optical axis direction of the camera module, the holder having a cylindrical shape having upper and lower cylindrical end portions;
   a coil provided on the holder;
   a yoke including four main magnets and two flat plate-shaped auxiliary magnets for providing a magnetic field to the coil, in which the yoke has a roughly rectangular and relatively thin box shape of which bottom side is opened so that the yoke is defined by four side wall portions including two pairs of opposite side wall portions and a top plate portion, and the yoke also has an opening formed in the top plate portion for receiving the holder and four corner portions inside thereof, wherein the opening is defined by a pair of opposed arch-shaped inner wall portions which are provided along an outer periphery of the opening and spaced apart by two opposed gaps between adjacent end portions of the pair of arch-shaped inner wall portions;

upper and lower leaf springs respectively attached to the upper and lower cylindrical end portions of the holder for supporting the holder so as to be displaceable along the optical axis direction of the lens unit; and a base which supports the yoke and the lower leaf spring;

wherein the coil is formed into a roughly cylindrical shape having two opposite outer circumferential flat surfaces, wherein one pair of the opposite side wall portions are respectively formed with concave portions within the two opposed gaps which protrude outwardly and are positioned between the adjacent corner portions, and wherein each of the four main magnets has a triangle block shape and they are respectively arranged at the four corner portions inside the yoke, and the two auxiliary magnets are respectively arranged within the concave portions of the opposite side wall portions of the yoke so as to face the corresponding outer circumferential flat surfaces of the coil through the corresponding gaps, respectively, in a state that the holder is inserted into the opening of the yoke.

2. The camera module as claimed in claim 1, further comprising a magnetic field correcting magnet, wherein the magnetic field correcting magnet is arranged so as to provide a magnetic flux in a vertical direction with respect to a direction of a magnetic flux of the main magnets and auxiliary magnets so that the magnetic flux of the main magnets and auxiliary magnets is forcedly directed toward the coil.

3. The camera module as claimed in claim 2, wherein the base is made of a magnetic material, and the magnetic field correcting magnet is formed by magnetizing the base.

* * * * *